US005246667A

United States Patent [19]

Hemzy et al.

[11] Patent Number: 5,246,667

[45] Date of Patent: Sep. 21, 1993

[54] ANALYTICAL FURNACE

[75] Inventors: Wayne R. Hemzy, St. Joseph; Carlos Guerra, Berrien Springs, both of Mich.

[73] Assignee: Leco Corporation, St. Joseph, Mich.

[21] Appl. No.: 659,707

[22] Filed: Feb. 25, 1991

[51] Int. Cl.[5] .................... G01N 31/12

[52] U.S. Cl. .................... 422/80; 422/78; 436/155; 436/159

[58] Field of Search .................... 422/78, 80; 436/155, 436/159

[56] References Cited

U.S. PATENT DOCUMENTS

| | | | |
|---|---|---|---|
| 3,972,682 | 8/1976 | Stephens et al. | 422/78 |
| 4,087,249 | 5/1978 | Okumoto et al. | 422/78 |
| 4,229,412 | 10/1980 | Orths et al. | 422/80 |
| 4,244,917 | 1/1981 | Woods et al. | 422/78 |
| 4,282,183 | 8/1981 | Bredeweg et al. | 422/78 |
| 4,352,781 | 10/1981 | O'Brien | 422/78 |
| 5,064,617 | 11/1991 | O'Brien et al. | 422/78 |

OTHER PUBLICATIONS

"Carbon And Graphite High Temperature Insulation" Polycarbon Inc. (A member of Sigri Group), Valencia Calif. 91355.

"Glassy Carbon-A Material For Use In Analytical Chemistry," Sigri Group.

*Primary Examiner*—Jill A. Johnston

*Attorney, Agent, or Firm*—Price, Heneveld, Cooper, DeWitt & Litton

[57] ABSTRACT

An analytical furnace includes a pair of generally vertically extending coaxially mounted spaced furnace tubes mounted to a support. The inner tube is made of a material which does not react with the specimen during pyrolysis to produce intereferring byproducts. An analytical sample crucible is supported above the support by a carbonaceous material which in the preferred embodiment comprises a combination of a carbon-felt packing material resting on the support and granular carbon black on which the crucible is placed. The material is selected to position the crucible in the hot zone of the furnace which includes a heater for heating an analytical sample for pyrolysis. The analytical furnace further includes a lance tube extending over and in coaxial alignment with the inner and outer furnace tubes for directing a sample and a carrier gas into the open mouth of the cup-shaped crucible.

20 Claims, 2 Drawing Sheets

ANALYTICAL FURNACE

BACKGROUND OF THE INVENTION

The present invention pertains to a furnace used for the pyrolysis of an analytical sample for subsequent analysis.

In the analysis of many organic materials which include halogens, conventional analytical furnaces which employ mullite, alumina or quartz pyrolysis tubes, react with the gaseous products of pyrolysis to provide interfering byproducts with the analysis of certain chemical elements such as oxygen. Thus for example, when fluorinated sample is pyrolized, it produces HF in gaseous form. This reacts with the mullite, alumina or quartz to provide water ($H_2O$). When oxygen is the element being detected, the additional oxygen provided by the interfering water byproduct, leads to an erroneous analytical result. The same effect takes place with other halogens but to a lesser extent since they are not as active as fluorine.

There exists a variety of pyrolysis systems utilizing coaxially spaced multiple tubes. Pending U.S. patent application, Ser. No. 480,777 filed on Feb. 16, 1990, entitled COMBUSTION SYSTEM, now U.S. Pat. No. 5,064,617 issued Nov. 12, 1991, assignee, discloses one such system which is oriented in a horizontal direction and which uses mullite as the inner combustion tube material. Such systems, although working well for most samples, suffer the difficulty mentioned above namely the reaction of fluorinated or other halogen containing samples with the pyrolysis tube itself to provide interfering byproducts of pyrolysis which result in inaccurate analytical results.

SUMMARY OF THE PRESENT INVENTION

The system of the present invention overcomes the difficulties of the prior art by providing an analytical furnace with coaxially mounted inner and outer spaced furnace tubes into which a sample is introduced and heated for the pyrolysis of the sample into gaseous byproducts. The inner tube is made of a material which does not react with the gaseous byproducts of pyrolysis to provide an interfering byproduct and in the preferred embodiment of the invention vitreous carbon is employed This material which does react to some extent with gaseous byproducts of the sample reacts with such products to produce, for example, when the sample is a fluorinated sample, carbon tetrafluoride ($CF_4$) or if a chlorinated sample, carbon tetrachloride ($CCl_4$). These gases do not contain oxygen and therefore do not interfere with the detection of oxygen contained in such organic samples.

In a preferred embodiment of the invention, the pair of coaxially mounted spaced furnace tubes are mounted on a base with an analytical sample crucible being supported on the base and positioned at the center of the furnace by a carbonaceous material which in the preferred embodiment comprises a combination of a carbon-felt packing material and granular carbon black on which the crucible is placed. As used herein carbonaceous material means a carbon-rich material. The material is selected to position the crucible in the hot zone of the furnace which includes heating means for heating an analytical sample to a temperature in the neighborhood of 1300 degrees C. Means are provided, preferably in the base for supplying an inert carrier gas such as helium or nitrogen into the furnace for sweeping gases from the sample contained in the crucible through the powdered carbon black and through the carbon-felt to an exit aperture in the base for subsequent analysis.

In a preferred embodiment of the invention, the analytical furnace further includes a lance tube extending over and in coaxial alignment with the inner and outer furnace tubes for supplying carrier gas to the interior of the furnace and for directing a sample into the open mouth of the cup-shaped crucible. The lance is made of graphite so as not to provide a reaction with the analytical sample gas. Thus the environment of the sample gas excludes any elements which can react with a halogen containing sample to prevent the introduction of interfering byproducts of pyrolysis. The outer furnace tube is suitably positioned in a furnace cabinet.

Accordingly, the system of the present invention provides an improved analytical furnace in which oxygen can be sensed with halogen containing organic specimens utilizing an inert carrier gas and a surrounding environment for the analytical specimen which contains no material which would react with gaseous byproducts of the pyrolytic process. The analytical furnace includes materials consisting essentially of carbon which do not react with gaseous byproducts of the pyrolytic process to produce oxygen. A unique multiple tube for a vertically extending furnace is provided in which these results are achieved in a relatively compact space which provides easy accessibility for the introduction of a carrier gas and samples for analysis.

These and other features, objects and advantages of the present invention, will become apparent by reading the following description thereof together with reference to the accompanying drawings in which:

DETAILED DESCRIPTION OF THE PREFERRED EMBODIMENT

Figure 1:
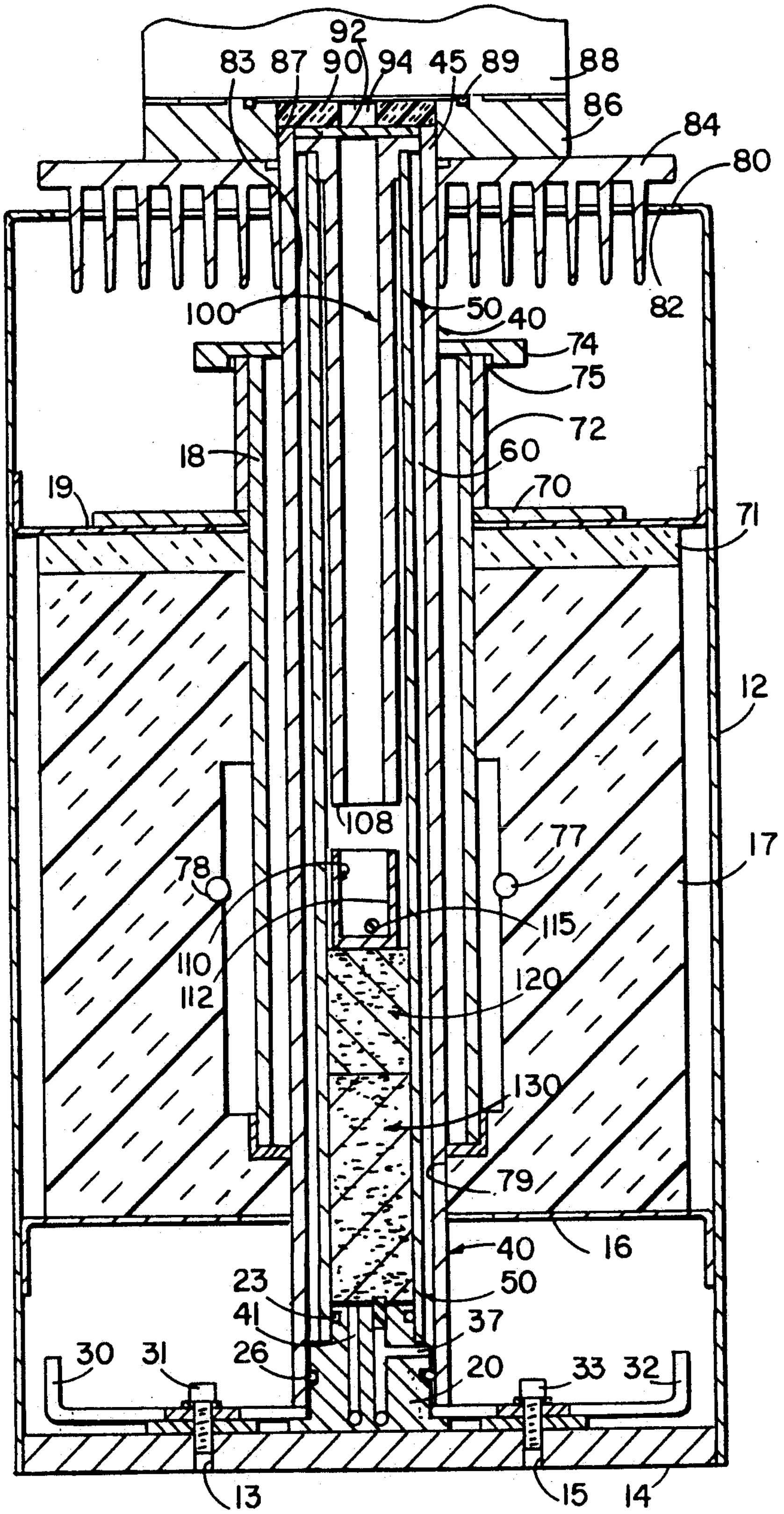
FIG. 1 is a vertical cross-sectional view of an analytical furnace embodying the present invention.
Figure 2:
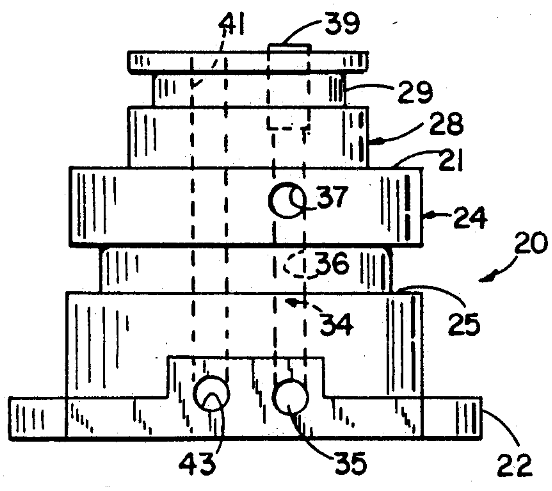
FIG. 2 is an enlarged front elevational view of a support member for the furnace shown in FIG. 1.
Figure 3:
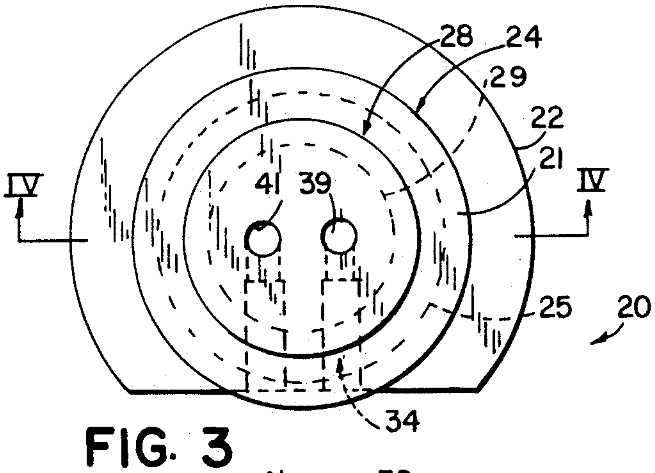
FIG. 3 is a top plan view of the structure shown in FIG. 2.
Figure 4:
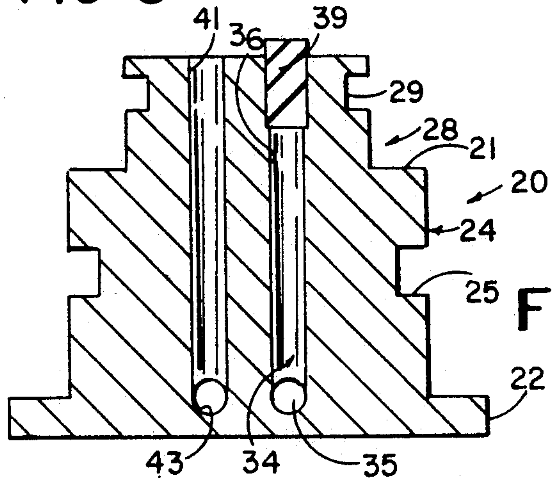
FIG. 4 is a cross-sectional view of the member shown in FIG. 2 taken along section line IV—IV of FIG. 3.

The analytical furnace 10 of the present invention is best seen in FIG. 1 and includes an outer sheet metal cabinet 12 supported on a base plate 14 to which there is centrally attached a furnace tube support member 20 made of a stainless steel material. Member 20 is shown in detail in FIGS. 2–4 and includes a lower generally disc-shaped flange 22 captivated on top of base 14 by means of a slotted plate 30 which is secured to plate 14 by means of fastening screws 31 and 33 respectively. Slotted plate 30 allows for easy adjustment in the positioning of support member 20 which support member 20 can be slid on top of base plate 14 within a 0.25 inch radius while still being held in place vertically. These screws extend through slotted apertures 38 for mounting member 30 and thus tube support 20 to the base and are secured into threaded apertures 13 and 15 of base 14. Member 30 rests upon spacer blocks 32 having a thickness corresponding to that of flange 22. Support member 20 is generally cylindrical in shape and includes, as best seen in FIGS. 2–4, a first upstanding section 24 having an annular groove 25 formed therein for receiving an O-ring seal 26 (FIG. 1) which sealably couples the lower end of an outer furnace tube 40 extending concentrically over and around section 24. Member 24 further includes a second upstanding upper section 28 having an annular O-ring receiving groove 29 for receiving an O-ring 23 therein for sealably coupling to the inner diameter of an inner furnace tube 50. Cylindrical tubes 40 and 50 rest at their lower ends on the slotted plate 30 or on the horizontally extending shoulder 21 extending between sections 24 and 28 of member 20 respectively.

Member 20 further includes a gas inlet passageway 34 which as best seen in FIGS. 1–4 includes a lower horizontally extending portion 35, a vertically extending section 36 and an upper horizontally extending section 37 which communicates at its terminal end with the annular space 60 extending between the inner furnace tube 50 and outer furnace tube 40. The end of the lower horizontally extending section 35 of passageway 34 is coupled to a source of inert gas such as helium or nitrogen for supplying a carrier gas to the cylindrical chamber 60 of furnace 10. Support member 20 further includes the upper end of the vertically extending section 36 of the passageway 34 and is plugged by means of a stainless steel silver soldered plug 39 such that the flow path is from the entry 35 vertically upwardly through passageway 36 then outwardly through passageway 37 into cylindrical space 60.

Support member 20 similarly includes a gas outlet passageway 41 which extends generally vertically downwardly from the upper surface of support member 20 and terminates in a lower horizontally extending passageway 43 to which a tube is coupled leading to the analytical equipment to which the furnace is attached such that the gaseous byproducts of pyrolysis are carried from furnace 10 through the outlet passageway 43.

Furnace 10 includes a generally horizontally extending support wall 16 (FIG. 1) which is attached to the outer cabinet wall 12 and which supports rigid fiberous insulation 17 which surrounds the pyrolysis area of the furnace in which a generally cylindrical silicon carbide electrical heating element 18 is mounted. An insulating gasket 71 covers the upper end of insulation member 17. The cylindrical heating element extends downwardly from slightly above an upper wall 19 of the furnace and includes electrical conductors (not shown) which are coupled to a supply of operating power such as 220 volts AC to provide thermal energy for the pyrolysis of a sample.

The electrical conductors are clamped at the upper end of the silicon carbide heating element 18. A clamping collar 72 provides means for supporting the heating element within the vertically extending recess 73 formed in the insulation 17. Member 72 rests on top of a ceramic (Zircar) support plate 70 which is mounted to upper wall 19. The heating element 18 is retained on top by a ceramic (Zircar) cap plate 74 having a recess 75. Plate 74 is fastened to upper wall 19 by means of a threaded standoff spacer (not shown). A section of the insulation 17 in area 76 is enlarged to define the hot zone of furnace 10 and a pair of thermocouples 77 and 78 are positioned on opposite sides of the center of the furnace 10 and are coupled to a suitable furnace control circuit for controlling the power applied to heating element 18 in a conventional manner to provide temperature control for the furnace near or at its operating temperature of about 1300 degrees. The fiberous insulation medium 17 also includes a lower stepped opening 79 permitting the outer furnace tube 40 to extend downwardly therethrough and through a similar opening in lower cabinet support 16. The stepped area 79 of insulation 17 also receives the lower or "cold end" of the heating element 18. This structure holds the heating element and outer combustion tube 40 concentrically aligned.

The upper end of the furnace cabinet 12 includes a top 80 with an opening 82 to which an extruded aluminum heat sink 84 is mounted and on top of which an aluminum sample drop plate 86 is attached and sealed thereto by means of an O-ring seal 85. Members 84 and 86 each include a circular opening 83 and 87 respectively for receiving the outer furnace tube 40. Above the sample drop plate 86, there is positioned a loading head 88 which may include an automatic sample dropping mechanism or the like if desired and which defines a cover for the open top of the furnace 10 which sealably engages the top surface of plate 86 and is sealed thereto by means of an O-ring 89. An insulating disc of Teflon 90 is positioned to engage the top surface 45 of outer furnace tube 40 and to guide the organic sample 115 from the loading head 88 to the top of a lance tube 100 which is made of a graphite material and is shown in detail in FIGS. 5 and 6.

Figure 5:
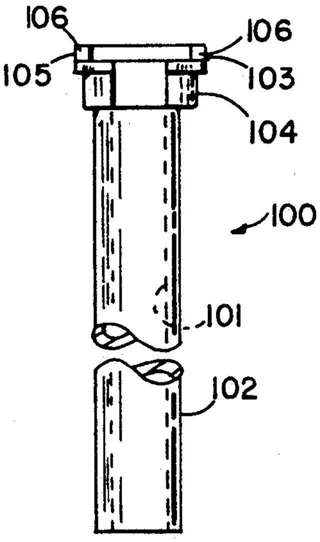
FIG. 5 is a side elevational view of the lance tube employed in the furnace shown in FIG. 1.
Figure 6:
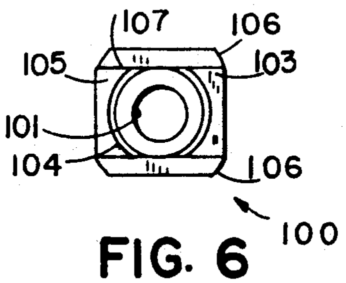
FIG. 6 is a bottom plan view of the lance tube shown in FIG. 5.

Lance tube 100 comprises a generally cylindrical body 102 having a central aperture 101 extending downwardly therethrough and terminates in a generally T-shaped top with outer extending flanges 103 and 105 extending outwardly on opposite sides of tube 102 as best seen in FIGS. 5 and 6. Flats 107 on each side of the flanges 103 and 105 and an intermediate section 104 provide a flow path for carrier gas introduced into space 60 to flow around the top of lance 100 and downwardly through the lance into the interior of the furnace. An intermediate section 104 has arcuate ends which fit within the inner diameter of the inner furnace tube 50 as best seen in FIG. 1 to space lance 100 in coaxially spaced relationship with in the inner furnace tube 50. The outer arcuate surfaces 106 of flanges 103 and 105 engage the inner cylindrical surface of outer furnace tube 40 as best seen in FIG. 1 with the flanges 103 and 105 resting on top of the inner furnace tube 50 for supporting the lance therein with a gap provided by flats 107 for carrier gas flow. A gap 92 extends between the upper surface of flanges 103 and 105 and the lower surface of washer 90 to further insulate the loading head 88 from the internal components of the furnace. The loading head 88 includes a solid bottom surface 94 which sealably encloses the top of the furnace during use.

Positioned below the lower end 108 of lance tube 100 is a graphite crucible 110 (FIG. 1) which is generally cup-shaped with a cylindrical sidewall 112 having an outer diameter somewhat smaller than the inner diameter of inner furnace tube 50 and a floor for receiving a specimen 115 to be analyzed. Crucible 110 rests upon a section of tube packing comprising granular carbon black 120 which is positioned over a rolled section 130 of carbon-felt packing material as best seen in FIG. 1. The carbon-felt pad, when rolled up, forms a resilient cylinder or plug 130 which when pressed into the inner furnace tube 50 is held in place by compression of the rolled carbon-felt 130 against the walls of the inner carbon tube 50. The length of the carbon-felt packing material 130 is selected to position, together with the carbon black material 120, crucible 110 in the center or the hot zone of furnace 10 for maximum efficiency. In one embodiment the carbon-felt material was a square graphite pad 0.25 inches thick and 2.25 inches on each side and was rolled and inserted in the lower end of tube 50 during assembly of the furnace. The inner furnace tube 50 thus surrounds the lance tube 100 and crucible 110 and holds the carbon-felt 130 and granular carbon black 120 in position.

Tube 50 is a cylindrical member made of a "glassy" or vitreous carbon material such that it will not react with halogen containing samples to produce interfering byproducts of pyrolysis. It will react with halogen containing specimens to some extent, but will not convert to an oxygen containing compound which could interfere with the oxygen detection system for the analyzer coupled to furnace 10. Tube 50 has a length of about 11.7 inches, an inner diameter of about 0.768 inches and an outer diameter of about 0.965 inches. The inner edges of the ends of the cylindrical tube are chamferred at 60 degrees and the interior ends are ground slightly to obtain accurate O-ring sealing at support 20 and to accurately position lance 100. The stock tube material is commercially available from the Sigri Corporation. The upper end of the tube 50 is supported around sections 104 of lance 100 which in turn engages the upper end of outer furnace tube 40 for positioning the lance 100, the inner tube 50, and the outer tube 40 in coaxially spaced relationship defining the annular gas passageway 60 between the inner and outer tubes and a pathway for carrier gas into the tube 50 from space 60.

The outer tube 40 comprises a mullite tube having a length of about 12.25 inches, an inner diameter of about 1.16 inches, and an outer diameter of about 1.38 inches. The lower end of tube 40 is supported on plate 30. The upper end of tube 40 extends within sample drop plate 86 and into engagement with the Teflon insulating disc 90. Thus at its lower end, support member 20 supports the furnace tubes 40 and 50 in coaxially spaced relationship while the configuration of the stepped upper portion of lance 100 provides a similar support and spacing at the upper end of the furnace.

The furnace is assembled by sequentially placing the respective coaxially extending tubes over the support member 20 with the O-ring seals in place once support member 20 has been positioned with respect to lower opening 79 in insulation 17. The outer furnace tube 40 is extended through the circular apertures in the plates 74, 19 and 16 of the furnace. Once the tubes are positioned on the support member 20, the carbon black material 120 poured and packed on top of the carbon-felt material until its upper surface aligns a distance slightly below the center zone of the furnace which can be determined by a suitable measuring rod. This positions the sample in the crucible at the center of the heating zone. The crucible 110 is then placed in position over the carbon black by sliding down the inner diameter of inner tube 50 utilizing a suitable insertion tool. The lance 100 is then positioned at the upper ends of the tubes for spacing the tubes in coaxially relationship with one another. The heat sink 84, plate 86 O-ring 85 and washer 90 are then positioned over the top ends of the tubes and lance.

In use, the loading head 88 opens and allows the organic sample 115 to drop into a chamber within the loading head 88. Carrier gas flows up and out of the loading head 88 thereby purging the sample and chamber of atmosphereic gases. Once the purging is complete the loading head is sealed and the the organic sample 115 is dropped downwardly through the central opening 101 of lance tube 100 which is aligned with the open mouth of crucible 110 such that the sample is positioned on the floor of the crucible as illustrated in FIG. 1. It is to be understood that the gas flow is regulated in a conventional manner by flow meters, pumps and the like and a gas flow path is provided through the oxygen analyzer (not shown) associated with the furnace. The carrier gas flows downwardly through the space between the outer diameter of the crucible (having and outer diameter of about 0.68 inches) and the inner diameter of tube 50 through the carbon black 120 once the furnace has been heated converting oxygen from the sample 115 to carbon monoxide (CO) which flows through the carbon-felt packing 130 outwardly through exit passageways 41 and 43 to the analyzer input coupled to outlet 43. The carbon monoxide is first converted to carbon dioxide before analysis by a conventional second furnace (not shown) in the presence of copper oxide material heated to approximately 650 degrees C. such that all of the oxygen from sample 115 is converted to carbon dioxide ($CO_2$) prior to analysis by infrared absorption or other conventional techniques in the analyzer. The exposure of the sample only to carbon through the graphite lance 100, vitreous carbon inner furnace tube 50 and carbon material 120 and 130 assures only the conversion of oxygen to carbon monoxide in the furnace without introducing other oxygen compounds thereby avoiding the introduction of any interfering byproducts of the pyrolysis.

It will become apparent to those skilled in the art the various modifications to the preferred embodiment of the invention as described herein and can be made without departing from the spirit or scope of the invention as defined by the appended claims.

The embodiments of the invention in which an exclusive property or privilege is claimed are defined as follows:

1. An analytical furnace comprising
a furnace cabinet and means for supporting inner and outer cylindrical tubes in spaced generally concentric relationship with one another to define an annular space therebetween wherein said inner tube has an outer diameter smaller than the inner diameter of said outer tube, said inner tube including materials consisting essentially of carbon;
means for supporting a crucible in a center area within said inner tube, said means for supporting including material consisting essentially of carbon;
means for supplying heat to said center area for the pyrolysis of a sample laced in said crucible;
support means at one end of said tubes for supporting said tubes and for supplying an inert carrier gas to said furnace; and
means at an opposite end of said tubes for selectively placing a sample in said crucible, for supporting said tubes at said opposite end, and for introducing a carrier gas into said inner tube, said means at said opposite end including materials consisting essentially of carbon.

2. An analytical furnace comprising:
a furnace cabinet and means for supporting inner and outer cylindrical tubes in spaced generally concentric relationship with one another to define an annular space therebetween wherein said inner tube has an outer diameter smaller than the inner diameter of said outer tube; and said outer tube has a length greater than said inner tube;

means for supporting a crucible in a center area within said inner tube;

means for applying heat to said center area for the pyrolysis of a sample placed in said crucible;

support means at one end of said tubes for supporting said tubes and for supplying an inert carrier gas to said furnace; and means at an opposite end of said tubes for selectively placing a sample in said crucible, for supporting said tubes at said opposite end, and for introducing a carrier gas into said inner tube;

wherein said tubes are aligned in a generally vertical direction and said support means includes a support member at said one end having a pair of spaced different diameter cylindrical grooves and sealing means over which said tubes extend for support.

3. The apparatus as defined in claim 2 wherein said support means further include an exit passageway communicating with the center area of said inner tube for receiving gaseous samples therefrom.

4. The apparatus as defined in claim 3 wherein said means at said opposite end includes a lance tube having an outer diameter less than an inner diameter of said inner tube and extending downwardly to a position spaced above said means for supporting said crucible.

5. The apparatus as defined in claim 4 wherein said means for supporting said crucible in the center region of said furnace comprises a material consisting essentially of carbon.

6. An analytical furnace comprising:

a furnace cabinet and means for supporting inner and outer cylindrical tubes in spaced generally concentric relationship with one another to define an annular space therebetween wherein said inner tube has an outer diameter smaller than the inner diameter of said outer tube;

means for supporting a crucible in a center area within said inner tube wherein said means for supporting said crucible in the center region of said furnace includes a section of granular carbon black material for converting oxygen from a specimen to carbon monoxide;

means for applying heat to said center area for the pyrolysis of a sample placed in said crucible;

support means at one end of said tubes for supporting said tubes and for supplying an inert carrier gas to said furnace wherein said tubes are aligned in a generally vertical direction and said support means includes a support member at said one end having a pair of different diameter cylindrical grooves and sealing means over which said tubes extend for support, said support means further include an exit passageway communicating with the center area of said inner tube for receiving gaseous samples therefrom; and means at an opposite end of said tubes for selectively placing a sample in said crucible, for supporting said tues at said opposite end, and for introducing a carrier gas into said inner tube;

wherein said means at said opposite end includes a lance tube having an outer diameter less than an inner diameter of said inner tube and extending downwardly to a position spaced above said means for supporting said crucible.

7. The apparatus as defied in claim 6 wherein said means for supporting said crucible in the center region of said furnace further includes carbon-felt material positioned between said support member and said carbon black material.

8. The apparatus as defined in claim 7 wherein said inner tube is made of a vitreous carbon material.

9. The apparatus as defined in claim 8 wherein said outer tube has a length greater than said inner tube.

10. The analytical furnace for pyrolyzing organic samples having halogen compounds therein comprising;

a furnace chamber defined in part by a generally vertically extending first cylindrical tube made of a vitreous carbon;

means for supplying a sample to the interior of said furnace chamber and applying heat to said sample for pyrolyzing said sample; and means for supplying an inert carrier gas to the interior of said furnace chamber and for withdrawing gaseous byproducts of the sample from the pyrolyzed sample.

11. The apparatus as defined in claim 10 wherein said furnace chamber is further defined by a crucible support for a crucible for holding a specimen to be analyzed comprising a section of carbon-felt.

12. The apparatus as defined in claim 10 wherein said means for supplying a sample to the crucible comprises a graphite lance tube.

13. An analytical furnace for pyrolyzing organic samples having halogen compounds therein comprising:

a furnace chamber;

means for supplying a sample to the interior of said furnace chamber and applying heat to said sample for pyrolyzing said sample; and means for supplying an inert carrier gas to the interior of said furnace chamber and for withdrawing gaseous byproduct of the sample from the pyrolyzed sample;

wherein said furnace chamber is defined in part by a generally vertically extending first cylindrical tube made of a vitreous carbon, wherein said furnace chamber is further defined by a crucible support for a crucible for holding a specimen to be analyzed, said crucible support comprising a section of carbon-felt and a section of granular carbon black positioned between a crucible placed in said furnace and said carbon-felt.

14. The apparatus as defined in claim 13 wherein said furnace further includes a second tube extending in coaxially spaced relationship around said first tube and wherein said means for supplying said carrier gas supplies said carrier gas in the cylindrical space between said tubes.

15. The apparatus as defined in claim 14 wherein said means or supplying said carrier gas includes a support member for supporting lower ends of said tubes, said support member including passageway means for receiving the carrier gas and supplying the carrier gas to said cylindrical space.

16. The apparatus as defined in claim 15 wherein said means for supplying a sample to said crucible comprises a lance tube extending downwardly from the top of said tubes, said lance tube further defining a passageway for carrier gas to enter the interior of said first tube from said cylindrical space between said tubes.

17. The apparatus as defined in claim 16 wherein said lance tube includes a stepped upper end for extending into upper ends of said tubes for holding said tubes in spaced coaxial relationship.

18. The apparatus as defined in claim 17 wherein said lance tube is generally cylindrical and extends downwardly to position slightly above a crucible positioned in said furnace.

19. The apparatus as defined in claim 18 wherein said lance tube is made of graphite.

20. An analytical furnace for pyrolyzing organic samples having halogen compounds therein comprising;

a vitreous carbon furnace chamber;

means for supporting an analytical sample in said furnace chamber;

means for applying heat to the furnace chamber to heat said sample for pyrolyzing said sample; and means for supplying an inert carrier gas to the interior of said furnace chamber and for withdrawing gaseous byproducts from the pyrolyzed sample through said supporting means.

* * * * *

UNITED STATES PATENT AND TRADEMARK OFFICE

CERTIFICATE OF CORRECTION

PATENT NO. : 5,246,667

DATED : September 21, 1993

INVENTOR(S) : Wayne R. Hemzy and Carlos Guerra

It is certified that error appears in the above-indentified patent and that said Letters Patent is hereby corrected as shown below:

Col. 1, line 26;
After "1991" insert --and assigned to the present--.
Col. 1, line 45-46;
After "employed" insert --.--.
Col. 6, line 1;
"atmosphereic" should be --atmospheric--.
Col. 6, line 13;
"and outer" should be --an outer--.
Col. 6, line 33;
"art the" should be --art that--.
Col. 6, line 35;
After "herein" delete --and--.
Col. 6, line 53;
"laced" should be --placed--.
Col. 7, line 60;
"tues" should be --tubes--.
Col. 7, line 67;
"defied" should be --defined--.
Col. 8, line 35;
"byproduct" should be --byproducts--.

Signed and Sealed this

Fifth Day of July, 1994

Attest:

Bruce Lehman

BRUCE LEHMAN

*Attesting Officer*

*Commissioner of Patents and Trademarks*